United States Patent
Hwang et al.

(10) Patent No.: US 11,639,898 B2
(45) Date of Patent: May 2, 2023

(54) SUBSTRATE EDGE TEST APPARATUS, SYSTEM, AND METHOD

(71) Applicant: Corning Incorporated, Corning, NY (US)

(72) Inventors: Sung-chan Hwang, Cheonal-si (KR); Ji Hwa Jung, Seoul (KR); Tae-ho Keem, Seongnam-si (KR); SoYoung Song, Seoul (KR)

(73) Assignee: Corning Incorporated, Corning, NY (US)

( * ) Notice: Subject to any disclaimer, the term of this patent is extended or adjusted under 35 U.S.C. 154(b) by 866 days.

(21) Appl. No.: 16/606,364

(22) PCT Filed: Apr. 18, 2018

(86) PCT No.: PCT/US2018/028048
§ 371 (c)(1),
(2) Date: Oct. 18, 2019

(87) PCT Pub. No.: WO2018/195132
PCT Pub. Date: Oct. 25, 2018

(65) Prior Publication Data
US 2023/0003661 A1    Jan. 5, 2023

(30) Foreign Application Priority Data
Apr. 18, 2017    (KR) .................. 10-2017-0050020

(51) Int. Cl.
*G01N 21/88*        (2006.01)
*G01N 21/95*        (2006.01)
(Continued)

(52) U.S. Cl.
CPC ..... *G01N 21/8806* (2013.01); *G01N 21/9503* (2013.01); *G02F 1/1309* (2013.01); *G06T 7/0004* (2013.01)

(58) Field of Classification Search
CPC ............ G01N 21/8806; G01N 21/9503; G06T 7/0004
(Continued)

(56) References Cited

U.S. PATENT DOCUMENTS 5,244,070 A    9/1993    Carmen et al.
7,280,197 B1   10/2007   Rosengaus
(Continued)

FOREIGN PATENT DOCUMENTS

CN    101115988 A    1/2008
CN    101484775 A    7/2009
(Continued)

OTHER PUBLICATIONS

Chinese Patent Application No. 201880039728.1, Office Action dated Feb. 19, 2022, 21 (13 pages of English Translation and 8 pages of Original Document), Chinese Patent Office.
(Continued)

*Primary Examiner* — Tri T Ton
(74) *Attorney, Agent, or Firm* — Matthew J. Mason

(57) ABSTRACT

An apparatus for testing an edge portion of a substrate, includes a first illumination source configured to irradiate light to an end portion of the edge portion of the substrate; a second illumination source configured to irradiate light to a lower portion of the edge portion; a third illumination source configured to irradiate light to an upper portion of the edge portion; and first to third photographing portions, respectively corresponding to the first to third illumination sources, wherein the first illumination source comprises a C-shaped cross-section and comprises a first curved surface facing the end portion of the edge portion, the second illumination source comprises a half C-shaped cross-section and comprises a second curved surface facing the lower portion of the edge portion, and the third illumination source
(Continued)

comprises a half C-shaped cross-section and comprises a third curved surface facing the upper portion of the edge portion.

4 Claims, 13 Drawing Sheets

(51) Int. Cl.
   *G02F 1/13* (2006.01)
   *G06T 7/00* (2017.01)
(58) Field of Classification Search
   USPC .................. 356/237.1–237.6, 239.1–239.8
   See application file for complete search history.

(56) References Cited

U.S. PATENT DOCUMENTS

| | | | |
|---|---|---|---|
| 8,120,654 B2 | 2/2012 | Okamura | |
| 8,325,334 B2* | 12/2012 | Ramachandran | G01N 21/9503 356/237.4 |
| 2009/0086483 A1 | 4/2009 | Hahn et al. | |
| 2009/0122304 A1 | 5/2009 | Jin et al. | |
| 2015/0198539 A1 | 7/2015 | Seong | |
| 2015/0355106 A1 | 12/2015 | Horn | |
| 2015/0370175 A1* | 12/2015 | Nicolaides | G01N 21/9503 355/77 |

FOREIGN PATENT DOCUMENTS

| | | |
|---|---|---|
| CN | 103105401 A | 5/2013 |
| CN | 104777168 A | 7/2015 |
| JP | 2008-235892 A | 10/2008 |
| JP | 2009-535782 A | 10/2009 |
| JP | 2010-002216 A | 1/2010 |
| JP | 4626982 B2 | 2/2011 |
| JP | 2013-160687 A | 8/2013 |
| JP | 2017-525141 A | 8/2017 |
| KR | 2013051874 A | 5/2013 |
| KR | 10-1452781 B1 | 10/2014 |
| KR | 10-2015-0085224 A | 7/2015 |
| KR | 1583016 B1 | 1/2016 |
| TW | 200630606 A | 9/2006 |
| TW | 200914818 A | 4/2009 |
| TW | 201029084 A | 8/2010 |
| WO | 2009/127574 A1 | 10/2009 |

OTHER PUBLICATIONS

Japanese Patent Application No. 2019-556332, Office Action, dated May 25, 2022, 10 pages (05 pages of English Translation and 05 pages of Original Copy); Japanese Patent Office.

International Search Report and Written Opinion of the International Searching Authority; PCT/US2018/028048; dated Aug. 6, 2018; 13 Pages; Korean Intellectual Property Office.

Taiwanese Patent Application No. 107112674, Office Action, dated Jan. 20, 2022, 1 page; Taiwanese Patent Office.

* cited by examiner

SUBSTRATE EDGE TEST APPARATUS, SYSTEM, AND METHOD

This application claims the benefit of priority under 35 U.S.C. § 371 of International Application Serial No. PCT/US2018/028048, filed on Apr. 18, 2018, which, in turn, claims the benefit of priority of Korean Patent Application Serial No. 10-2017-0050020, filed on Apr. 18, 2017, the contents of which are relied upon and incorporated herein by reference in their entireties.

FIELD

The present disclosure relates to a substrate edge test apparatus, system, and method, and more particularly, to a substrate edge test apparatus, system, and method for testing a substrate for defects existing in an edge portion thereof.

BACKGROUND

A glass substrate used in flat panel displays such as thin film transistor-liquid crystal displays (TFT-LCDs), plasma display panels (PDPs), electroluminescent (EL) displays, etc. is manufactured through a forming process. During the forming process, glass that is melted in a glass melting furnace is formed into a flat plate, the glass is cut according to a predetermined standard in a cutting process, and then, the cut glass is moved to a processing station to be further processed. At the processing station, the glass substrate can be cut according to a standard for flat panel displays, and a chamfering process for chamfering four edges of the glass substrate can be performed. In addition, after the chamfering process, a test can be performed to check whether defects such as chips or cracks have occurred in the edges chamfered through the chamfering process.

SUMMARY

One or more embodiments of the present disclosure provide an apparatus for testing an edge portion of a substrate, the apparatus including: a first illumination source configured to irradiate light to an end portion of the edge portion of the substrate; a second illumination source configured to irradiate light to a lower portion of the edge portion; a third illumination source configured to irradiate light to an upper portion of the edge portion; and first to third photographing portions, respectively corresponding to the first to third illumination sources, wherein the first illumination source comprises a C-shaped cross-section and comprises a first curved surface facing the end portion of the edge portion, the second illumination source comprises a half C-shaped cross-section and comprises a second curved surface facing the lower portion of the edge portion, and the third illumination source comprises a half C-shaped cross-section and comprises a third curved surface facing the upper portion of the edge portion.

One or more embodiments of the present disclosure provide a system for testing an edge portion of a substrate, the system including: a first photographing portion configured to generate a first image by photographing an end portion of the edge portion of the substrate; a second photographing portion configured to generate a second image by photographing a lower portion of the edge portion; a third photographing portion configured to generate a third image by photographing an upper portion of the edge portion; first to third illumination sources sequentially, respectively corresponding to the first to third photographing portions and configured to provide light with uniform illuminance; and a test data analysis unit configured to collect the first to third images, wherein the second illumination source is half C-shaped and includes a second curved surface facing the lower portion of the edge portion, and the third illumination source is half C-shaped and includes a third curved surface facing the upper portion of the edge portion.

One or more embodiments of the present disclosure provide a substrate edge test method including: generating a first image by irradiating light with uniform illuminance to an end portion of the edge portion of a substrate and photographing the end portion by using a first photographing portion, wherein the edge portion of the substrate is chamfered; generating a second image by irradiating light with uniform illuminance to a lower portion of the edge portion and photographing the lower portion by using a second photographing portion; generating a third image by irradiating light with uniform illuminance to an upper portion of the edge portion and photographing the upper portion by using a third photographing portion; and evaluating quality of the edge portion of the substrate based on the first image to the third images, wherein the evaluating of the quality of the edge portion in the substrate based on the first to third images comprises: summing up a first area comprising at least one area of defects within a set of first reference lines, wherein the first reference lines are predetermined reference lines on the first image; summing up a second area comprising at least one area of defects within a set of second reference lines, wherein the second reference lines are predetermined reference lines on the second image; summing up a third area comprising at least one area of chipping defects within a set of third reference lines, wherein the third reference lines are predetermined reference lines on the third image; and dividing a sum of the first to third areas by an area of the edge portion.

Additional features and advantages of the embodiments disclosed herein will be set forth in the detailed description which follows, and in part will be readily apparent to those skilled in the art from that description or recognized by practicing the disclosed embodiments as described herein, including the detailed description which follows, the claims, as well as the appended drawings.

It is to be understood that both the foregoing general description and the following detailed description present embodiments intended to provide an overview or framework for understanding the nature and character of the claimed embodiments. The accompanying drawings are included to provide further understanding, and are incorporated into and constitute a part of this specification. The drawings illustrate various embodiments of the disclosure, and together with the description serve to explain the principles and operations thereof.

DETAILED DESCRIPTION

Figure 1:
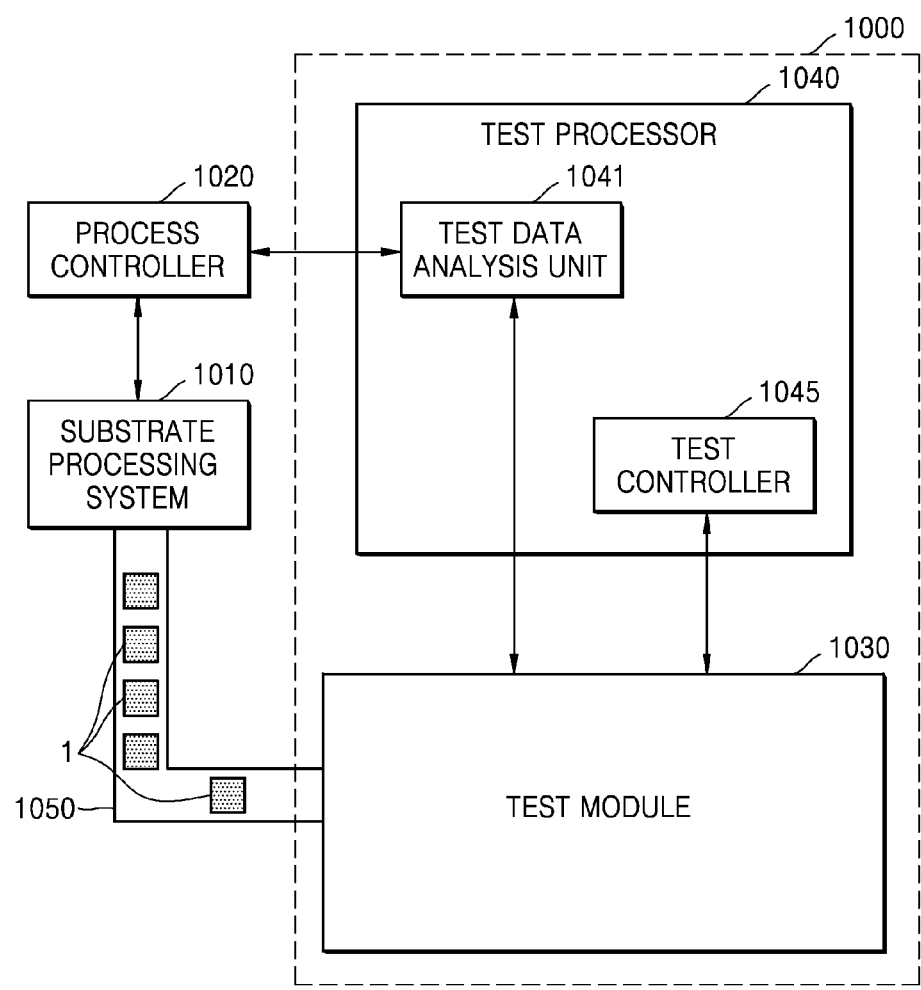
FIG. 1 is a block diagram of a substrate edge test system according to exemplary embodiments.

Hereinafter, exemplary embodiments of the present disclosure will be described in detail with reference to accompanying drawings. Like reference numerals denote the same elements on the drawings and repeated descriptions thereof are omitted.

FIG. 1 is a block diagram of a substrate edge test system 1000 according to exemplary embodiments.

Referring to FIG. 1, the substrate edge test system 1000 may include a test module 1030 and a test processor 1040.

According to exemplary embodiments, a substrate processing system 1010 may include a plurality of stations for producing a substrate 1. For example, the substrate processing system 1010 may include various processing stations such as a melt processing station, a shape processing station, a cut processing station, a chamfer processing station, a polish processing station, etc. However, the present disclosure is not limited thereto, and the substrate processing system 1010 may also include a cleanse processing station, a film accumulation processing station, a photolithography processing station, an etching processing station, a strip processing station, etc. The substrate processing system 1010 may produce the substrate 1 and provide the substrate 1 to a transport unit 1050.

A process controller 1020 may control the substrate processing system 1010. The process controller 1020 may be a computing device such as a work station computer, a desk top computer, a laptop computer, a tablet computer, etc. The process controller 1020 may store software for performing various functions such as receiving feedback with respect to processes, receiving test data, adjusting processes, etc.

According to exemplary embodiments, the substrate 1 may be a glass substrate. In this case, the substrate 1 may be used for manufacturing a flat panel display such as a thin film transistor-liquid crystal display (TFT-LCD), a plasma display panel (PDP), an electroluminescent (EL) display, etc.

The transport unit 1050 may be a transport system that may transport the substrate 1 produced by the substrate processing system 1010. The transport unit 1050 may include a conveyor system, etc. The transport unit 1050 may provide the substrate 1 to the test module 1030.

The test module 1030 may include one or more test stations capable of performing various tests with respect to the substrate 1. The substrate 1 may be loaded onto each of the test stations. According to the example embodiments, the test module 1030 may perform a test for checking whether the substrate 1 includes defects.

The test module 1030 may include a substrate edge test apparatus. The test module 1030 may check for defects that may have occurred during the chamfering process, e.g., non-chamfering, over-chamfering, burning, chipping, cracking, etc. The test module 1030 may check for defects in the substrate edge, an upper surface, and/or a lower surface of the substrate.

The test processor 1040 may include a test data analysis unit 1041 analyzing test data transmitted from the test module 1030 and a test controller 1045 controlling the test module.

According to exemplary embodiments, a test data analysis unit 1041 may compare a degree of defect occurrence with a reference value or threshold values based on the test data. According to the example embodiments, this comparison may be performed through a look-up function with respect to data stored in the substrate edge test system 1000 and/or comparison with off-line data. The test data analysis unit 1041 may collect data from first to third photographing portions 200a, 200b, and 200c, which will be described later (see FIG. 4), so as to generate first to third images E1, E2, and E3 (see FIG. 8) that are respectively images of an end portion 1a (see FIG. 3), a lower portion 1b (see FIG. 3), and an upper portion 1c (see FIG. 3) of the edge portion.

The test data analysis unit 1041 may provide analysis data (that is obtained by analyzing the test data) to the processing controller 1020. The processing controller 1020 may transmit a feedback signal to the substrate processing system 1010 based on the analysis data. Based on the feedback signal, the substrate processing system 1010 may adjust and/or select processes to be performed.

The feedback signal may influence various elements that are used in performing and/or selecting of the substrate treatment processes. For example, the test data analyzed by the test data analysis unit 1041 may be provided to the processing controller 1020. After that, based on the analysis data, the processing controller 1020 may adjust one or more processing elements and/or selection of a certain processing element from among a plurality of processing elements.

The test module 1030 may be controlled by the test controller 1045. According to exemplary embodiments, the test controller 1045 is shown to be adjacent to the test module 1030, but is not limited thereto. For example, the test controller 1045 may be a computing device including one or more software products capable of controlling operations of the test module 1030, for example, a work station computer, a desk top computer, a laptop computer, a tablet computer, etc.

The substrate edge test system 1000 may perform a test with respect to the substrate 1 having various sizes and usages. For example, the substrate edge test system 1000 may perform a test with respect to a glass substrate.

Figure 2:
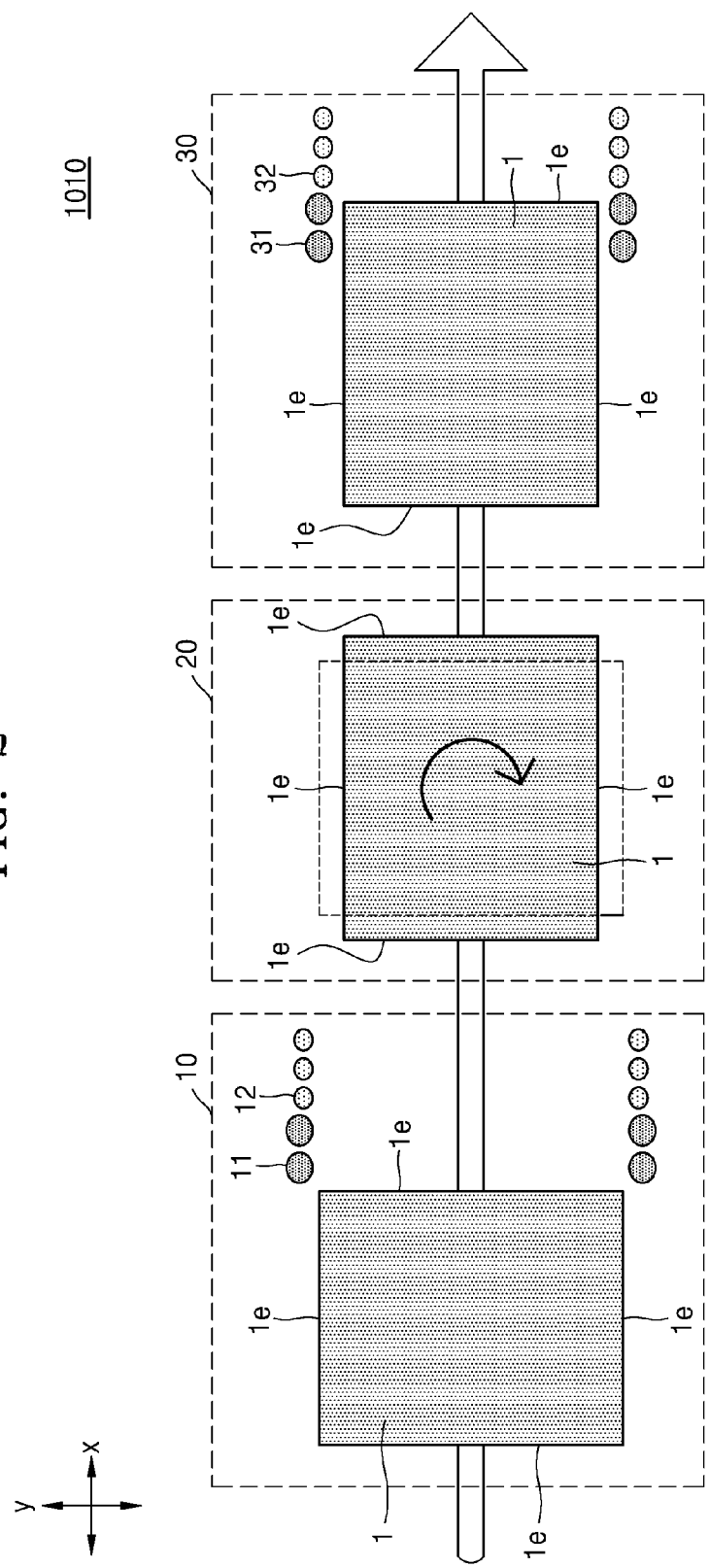
FIG. 2 is a schematic diagram of chamfering equipment that may be included in the substrate edge test system according to exemplary embodiments.
Figure 3:
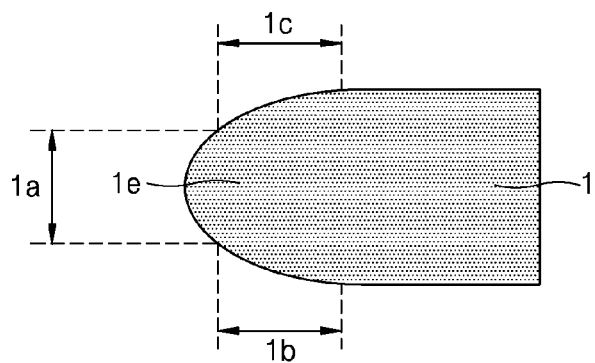
FIG. 3 is a cross-sectional view illustrating an edge of a chamfered substrate according to exemplary embodiments.

FIG. 2 is a schematic diagram of chamfering equipment that may be included in the substrate edge test system according to an example embodiment. FIG. 3 is a cross-sectional view illustrating an edge of a chamfered substrate according to exemplary embodiments.

Referring to FIGS. 2 and 3, the chamfering equipment may include a first stage 10, a second stage 20, and a third stage 30. A straight arrow denotes a moving direction of the substrate 1, and a curved arrow denotes a rotation of the substrate 1. The substrate 1 may be conveyed by the transport unit such as a conveyor.

The substrate 1 may be loaded on the first stage 10 by the transport unit. The substrate 1 may have edge portions 1e respectively corresponding to edges or four sides of a rectangle. The substrate 1 may extend in a first direction (x direction) parallel to the upper surface of the substrate 1 and in a second direction (y direction) parallel to the upper surface and intersecting the first direction (x direction). The first direction (x direction) and the second direction (y direction) may be substantially perpendicular, but are not limited thereto. Two of the four edge portions 1e may extend substantially parallel to the first direction (x direction). The other two edge portions 1e of the four edge portions 1e may extend substantially in parallel in the second direction (y direction). Unless otherwise specified, definitions of the extending direction of the edge portion 1e and the first and second directions (x direction, y direction), which are the extension directions of the substrate, are the same as those described above. The first stage 10 may include first chamfering wheels 11 and first polishing wheels 12. As the substrate 1 moves along with the first stage 10, the first chamfering wheels 11 may chamfer the edge portions 1e of the substrate 1. In addition, the first polishing wheels 12 may polish the edge portions 1a, that have been chamfered, so as to reduce roughness generated during the chamfering process.

The chamfering process is a process of rounding the edge portions 1e of the glass substrate in order to prevent the edge portions 1e from being easily damaged by an external shock, etc. When the chamfering process is performed, as shown in FIG. 3 each of the edge portions 1e of the substrate 1 includes the end portion 1a, the lower portion 1b, and the upper portion 1c.

The lower portion 1b and the upper portion 1c of the edge portion 1e can be changed in accordance with the arrangement of the substrate 1 relative to a space, for example, the arrangement of the substrate 1 relative to the ground surface. Specifically, when one of the first direction (x direction) and the second direction (x direction), which is the direction in which the substrate extends substantially, is substantially perpendicular to the ground surface, the lower portion 1b and the upper portion 1c may be disposed on the left and right sides, respectively, with respect to the end portion 1a of the edge portion 1e from the viewpoint of the observer standing perpendicular to the ground. On the other hand, as described in this specification, when the first direction (x direction) and the second direction (x direction), which are the directions in which the substrate extends substantially, are parallel to the ground surface, the lower portion 1b of the edge portion 1e and the upper portion 1c may be arranged on the upper side and the lower side with respect to the end portion 1a of the edge portion 1e from the viewpoint of the observer standing perpendicular to the ground. Therefore, the terms "lower portion 1b" and "upper portion 1c" of the edge portion 1e used hereinafter are only for convenience of description and do not limit the idea of the present invention in any sense. Further, in accordance with the general process of manufacturing the substrate 1, the substrate 1 during processing includes an upper surface exposed to the processing environment and a lower surface in contact with a supporting structure included in a carrier, a conveyor, etc. Therefore, if a predetermined portion of the edge 1e adjacent to the lower surface of the substrate is defined as the lower portion 1b and a predetermined portion of the edge 1e adjacent to the upper surface of the substrate 1 is defined as the upper portion 1c, the definition of the lower portion 1b and the upper portion 1c of the edge portion 1e will obvious to those of ordinary skill in the art. However, the present invention is not limited thereto, and the lower portion 1b and the upper portion 1c of the edge portion 1e may be interchanged with each other when the substrate 1 is inverted during the process. In this case, the lower portion of the edge portion before the substrate is inverted can be the upper portion of the edge portion after the substrate is inverted, and the upper portion of the edge portion before the substrate is inverted can be the lower portion of the edge portion after the substrate is inverted. In order to simultaneously perform the chamfering and the polishing of two edge portions 1e facing each other, the first chamfering wheels 11 and the first polishing wheels 12 in the first stage 10 may be arranged in two rows spaced apart from each other in a direction perpendicular to the moving direction of the substrate 1. The first chamfering wheels 11 and the first polishing wheels 12 in a row may be in parallel with the moving direction of the substrate 1 and may chamfer and polish an adjacent edge portion 1e. At the same time, the first chamfering wheels 11 and the first polishing wheels 12 in the other row may chamfer and polish another edge portion 1e facing the above edge portion 1e. Accordingly, two facing edge portions 1e of the substrate 1 may be simultaneously chamfered and polished on the first stage 10. The first chamfering wheels 11 may be closer to an inlet of the first stage 10 than the first polishing wheels 12 so that the substrate 1 may be firstly chamfered and then polished. A distance between the first chamfering wheels 11 and the first polishing wheels 12 in a row and the first chamfering wheels 11 and the first polishing wheels 12 in the other row may vary depending on a size of the substrate 1 that is chamfered and polished. Referring to FIG. 2, the first stage 10 is shown to have four first chamfering wheels 11 and six first polishing wheels 12, but is not limited thereto.

The second stage 20 may rotate the substrate 1. The second stage 20 may, for example, rotate the substrate 1 by an angle of about 90°. Accordingly, the other pair of edge portions 1e of the substrate 1 may be chamfered and polished.

The third stage 30 may include second chamfering wheels 31 and second polishing wheels 32. The edge portions 1e that have not been chamfered and polished on the first stage 10 may be chamfered and polished on the third stage 30. Like the first stage 10, the third stage 30 may include the second chamfering wheels 31 and the second polishing wheels 32 in two separate rows, so that two facing edge portions 1e may be simultaneously chamfered and polished. Referring to FIG. 2, the third stage 30 is shown to have four second chamfering wheels 31 and six second polishing wheels 32, but is not limited thereto.

If the substrate 1 is substantially rectangular, lengths of a pair of two facing edge portions 1e and lengths of the other pair of two facing edge portions 1e may be different from each other. However, the example embodiments are not limited thereto, and if the substrate 1 has substantially a square shape, the lengths of the four edge portions 1e may be substantially equal to one another.

Figure 4A:
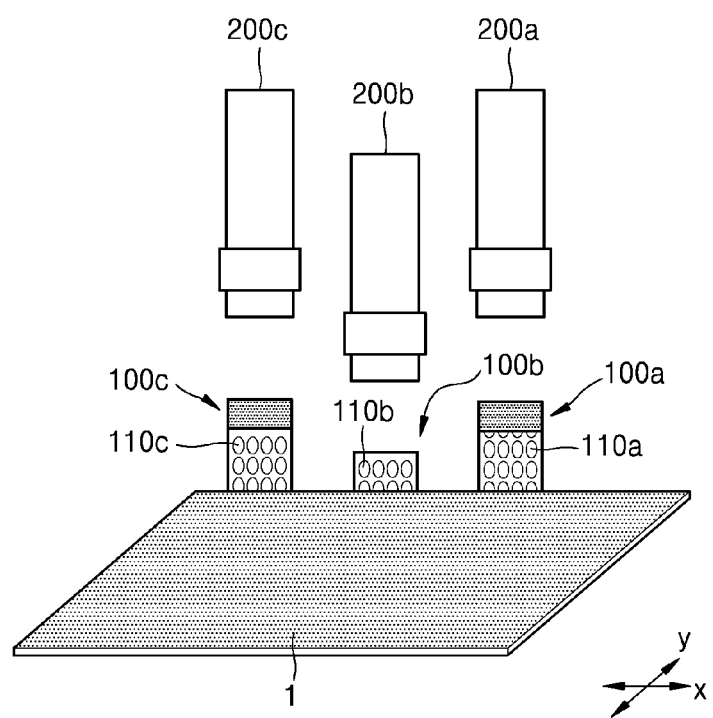
FIGS. 4A to 4C are respectively a perspective view, a side view, and a layout of an optical system that may be included in a substrate edge test apparatus according to exemplary embodiments.
Figure 4B:
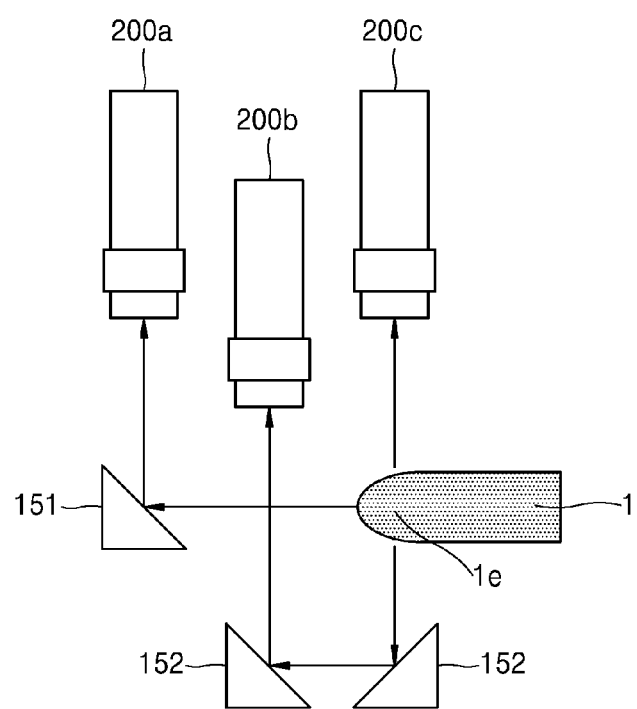
Figure 4C:
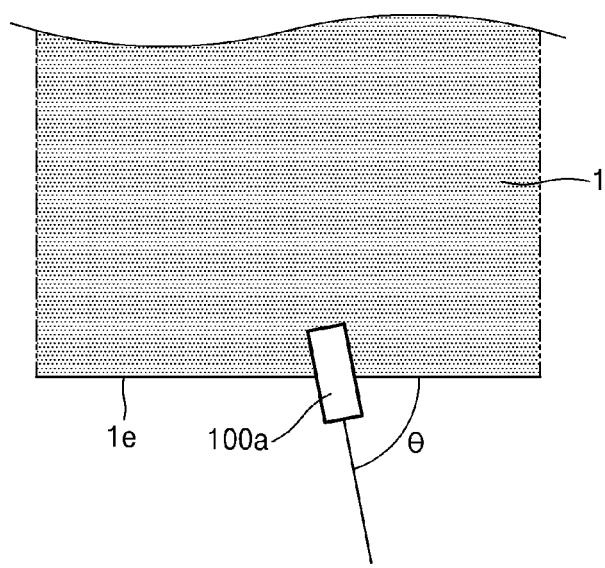
Figure 5A:
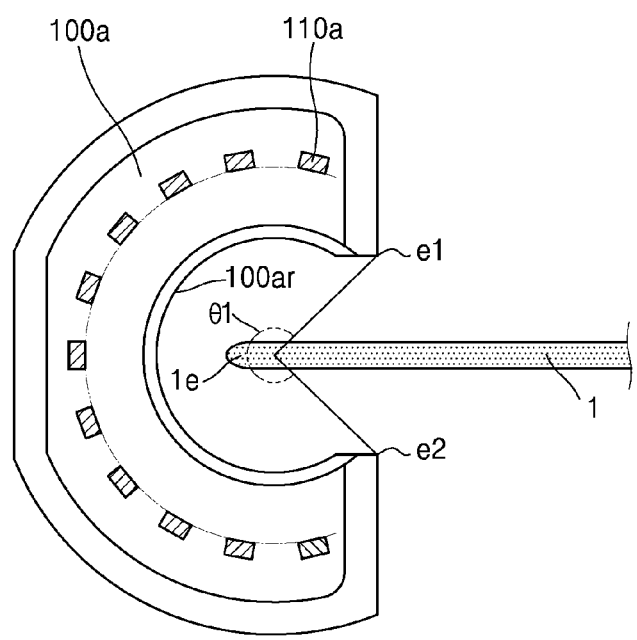
FIGS. 5A to 5C are cross-sectional views illustrating illumination sources that may be included in a substrate edge test apparatus according to exemplary embodiments.
Figure 5B:
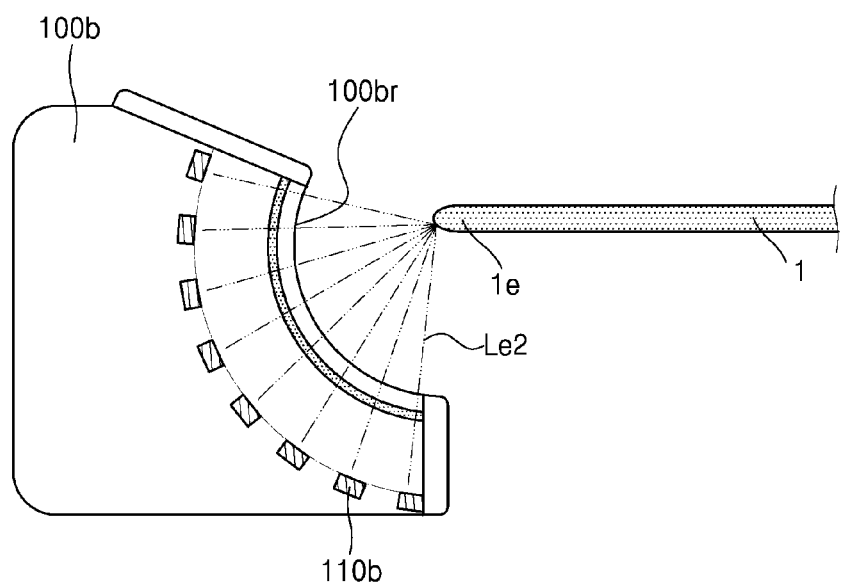
Figure 5C:
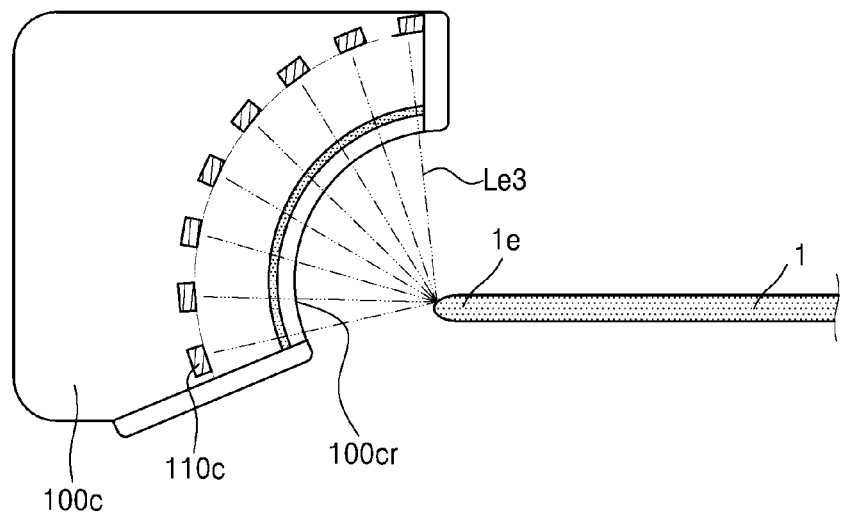

FIG. 4A is a perspective view of an optical system that may be included in a substrate edge test apparatus according to exemplary embodiments. FIG. 4B is a side view of an optical system that may be included in a substrate edge test apparatus according to exemplary embodiments. FIG. 4C is a layout showing relative arrangements of a first illumination source and the substrate. FIGS. 5A to 5C are cross-sectional views illustrating illumination sources that may be included in a substrate edge test apparatus according to exemplary embodiments.

Referring to FIGS. 3 to 5C, the substrate edge test apparatus may include first to third illumination sources 100a, 100b, and 100c and first to third photographing portions 200a, 200b, and 200c. The substrate edge test apparatus may further include a first reflection unit 151 and a plurality of second reflection units 152.

The first illumination source 100a may correspond to the first reflection unit 151 and the first photographing portion 200a. The first illumination source 100a may irradiate light of uniform illuminance to the end portion 1a of the edge portion 1e. The first illumination source 100a may irradiate light of uniform illuminance to the entire edge portion 1e. The light irradiated from the first illumination source 100a is reflected by the end portion 1a of the edge portion 1e, and after that, may reach the first photographing portion 200a via the first reflection unit 151. The irradiation of light of uniform illuminance to the end portion 1a and/or the edge portion 1e means that the energy per unit area of the light irradiated to the end portion 1a and/or the edge portion 1e is substantially the same throughout the end portion 1a and/or the edge portion 1e.

The second illumination source 100b may correspond to the plurality of second reflection units 152 and the second photographing portion 200b. The second illumination source 100b may irradiate light of uniform illuminance to the lower portion 1b of the edge portion 1e. The light irradiated from the second illumination source 100b is reflected by the lower portion 1b of the edge portion 1e, and after that, may reach the second photographing portion 200b via the plurality of second reflection units 152.

The third illumination source 100c may correspond to the third photographing portion 200c. The third illumination source 100c may irradiate light of uniform illuminance to the upper portion 1c of the edge portion 1e. The light irradiated from the third illumination source 100c is reflected by the upper portion 1c of the edge portion 1e, and then, may reach the third photographing portion 200c.

The first to third illumination sources 100a, 100b, and 100c may be spaced apart from one another and arranged in a predetermined direction. As will be described later, the substrate edge test apparatus can inspect the edge portion 1e of the substrate 1 while proceeding in a predetermined direction. The first to third illumination sources 100a, 100b, and 100c may be spaced apart from one another and arranged in a direction substantially parallel to the proceeding direction of the substrate edge test apparatus. The extending direction of the edge portion of the substrate 1 loaded on the substrate edge test apparatus may be substantially parallel to the proceeding direction of the substrate edge test apparatus. The first to third illumination sources 100a, 100b, and 100c may be spaced apart from one another and arranged in an extending direction of the edge portion 1e after being loaded. The extending direction of the edge portion 1e of the substrate 1 may be the first direction (x direction) and/or the second direction (y direction) described with reference to FIG. 2.

The first to third photographing portions 200a, 200b, and 200c may be spaced apart from one another and arranged in a direction substantially parallel to the proceeding direction of the substrate edge test apparatus. The first to third illumination sources 100a, 100b, and 100c may be spaced apart from one another and arranged in an extending direction of the edge portion 1e after loaded. In exemplary embodiments, the substrate edge test apparatus may test the end portion 1a, the lower portion 1b, and the upper portion 1c of the edge portion 1e at the same time. The first to third illumination sources 100a, 100b, and 100c and the first to third photographing portions 200a, 200b, and 200c may capture images of the edge portion 1e while proceeding from an end portion to the other portion in the extending direction of the edge portion 1e.

As shown in FIG. 5A, the first illumination source 100a may be C-shaped in cross-section and includes a first curved surface 100ar facing the end portion 1a of the edge portion 1e. A profile of the first curved surface 100ar may include a part of at least one of a circle, an oval, a parabola, or a hyperbola, but is not limited thereto. The first curved surface 100ar may have a profile that is similar to the edge portion 1e. The first curved surface 100ar may have a profile that is substantially the same as the edge portion 1e. The first illumination source 100a may include a plurality of first light sources 110a that are arranged in rows and columns along the first curved surface 100ar. The plurality of first light sources 110a may be evenly distributed along the first curved surface 100ar. The plurality of first light sources 110a may be arranged so that intervals between neighboring first light sources 110a along the first curved surface 100ar are substantially equal to each other. The first light sources 110a may include, for example, light emitting diode (LED) light sources, but are not limited thereto. The first light sources 110a may be arranged so that the light may be irradiated evenly throughout the entire edge portion of the substrate 1.

A first central angle θ1, which is a central angle of the first illumination source 100a, may be about 180° or greater, but is not limited thereto. The central angle denotes an angle between a straight line connecting an end point e1 of the first illumination source 100a adjacent to the substrate 1 to a center point and a straight line connecting another end point e2 of the first illumination source 100a adjacent to the substrate 1 to the center point. When the first central angle θ1 is equal to or greater than about 180°, the light may be uniformly irradiated to the entire edge portion 1e even in a case where an angle between the upper surface and/or the lower surface of the substrate and a tangent of the profile of the edge portion 1e is equal to or greater than a predetermined angle. The first illumination source 100a may further include a light diffuser for irradiating the light of uniform illuminance.

Referring to FIG. 4C, the first illumination source 100a may be inclined towards the extending direction of the edge portion by a first angle θ. Accordingly, the light irradiated from the first illumination source 100a is reflected by the end portion 1a of the edge portion 1e and the first reflection unit 151, and reaches the first photographing portion 200a. The first photographing portion 200a may generate a first image E1 (see FIG. 8), which is an image of the end portion 1a of the edge portion 1e, and transmit the first image E1 to the test data analysis unit 1041.

As shown in FIG. 5B, the second illumination source 100b may be a half C-shape in cross-section having a second curved surface 100br facing the lower portion of the edge portion 1e. As shown in FIG. 5C, the third illumination source 100c may be a half C-shape in cross-section having a third curved surface 100cr facing the upper portion of the edge portion 1e. Profiles of the second and third curved surfaces 100br and 100cr may respectively include a part of at least one of a circle, an oval, a parabola, and a hyperbola, but are not limited thereto. The second and third curved surfaces 100br and 100cr may have the profiles that are similar to a part of the edge portion 1e. The second and third curved surfaces 100br and 100cr may have the profiles that are substantially equal to a part of the edge portion 1e. That is, the profile of the second and third curved surfaces 100br and 100cr may be substantially the same as the profile of a part of the edge portion 1e enlarged by a predetermined ratio. The profile of the second curved surface 100br may include an enlarged profile of the lower portion 1b of the edge portion 1e. The third curved surface 100cr profile may include an enlarged profile of the upper portion 1c of the edge portion 1e. The second and third illumination sources 100b and 100c may respectively include a plurality of second and third light sources 110*b* and 110*c* that are arranged in rows and/or columns along the second and third curved surfaces 100*br* and 100*cr*. The plurality of second and third light sources 110*b* and 110*c* may be evenly distributed respectively along the second and third curved surfaces 100*br* and 100*cr*. The second light sources 110*b* may be arranged so that intervals between the neighboring second light sources 110*b* along the second curved surface 100*br* may be substantially equal to each other. The third light sources 110*c* may be arranged so that intervals between the neighboring third light sources 110*c* along the third curved surface 100*cr* may be substantially equal to each other. The second and third light sources 110*b* and 110*c* may include, for example, LED light sources, but are not limited thereto. The second light sources 110*b* may be arranged so that second light Le2, that is, the light irradiated from the second light sources 110*b*, may be substantially focused onto a point of the lower portion 1*b* of the edge portion 1*e*. The third light sources 110*c* may be arranged so that third light Le3, that is, the light irradiated from the third light sources 110*c*, may be substantially focused onto a point of the upper portion 1*c* of the edge portion 1*e*. Although not shown in the drawings, the second and third illumination sources 100*b* and 100*c* may further respectively include a light diffuser.

The light irradiated from the second illumination source 100*b* may be reflected by the lower portion 1*b* of the edge portion 1*e* and the plurality of second reflection units 152 towards the second photographing portion 200*b*. The second photographing portion 200*b* may generate a second image E2 (see FIG. 8), which is an image of the lower portion 1*b* of the edge portion 1*e*, and transmit the second image E2 to the test data analysis unit 1041, etc.

The light irradiated from the third illumination source 100*c* is reflected by the upper portion 1*c* of the edge portion 1*e* and reaches the third photographing portion 200*c*. The third photographing portion 200*c* generates a third image E3 (see FIG. 8), which is an image of the upper portion 1*c* of the edge portion 1*e*, and transmit the third image E3 to the test data analysis unit 1041, etc.

If the second and third illumination sources having C-shapes in cross-section, not the half C-shape, are used, clarity of the image may decrease due to interference between the light transmitted through the upper surface or the lower surface of the substrate 1 and the light reflected by the edge portion 1*e*. In detail, if the second illumination source 100*b* having a C-shape is used to capture an image of the lower portion 1*b* of the edge portion 1*e*, the light transmitted through the upper surface of the substrate 1, the upper surface not being chamfered, and the light reflected by the lower portion 1*b* of the edge portion 1*e* interfere with each other. Therefore, when the second illumination source is C-shaped, a clear image of the lower portion 1*b* of the edge portion 1*e* may not be obtained due to the interference between the transmitted light and the reflected light. In addition, if the third illumination source 100*c* having a C-shape in cross-section is used to capture an image of the upper portion 1*c* of the edge portion 1*e*, the light transmitted through the lower surface of the substrate 1, the lower surface not being chamfered, and the light reflected by the upper portion 1*c* of the edge portion 1*e* interfere with each other. Therefore, when the third illumination source is C-shaped, a clear image of the upper portion 1*c* of the edge portion 1*e* may not be obtained due to the interference between the transmitted light and the reflected light.

According to exemplary embodiments, the second illumination source 100*b* may cover the lower portion 1*b* of the edge portion 1*e*. The second illumination source 100*b* may irradiate light so that the irradiated light reaches the lower portion 1*b* of the edge portion 1*e* but does not reach the upper portion 1*c* of the edge portion 1*e*. The second illumination source 100*b* may at least partially expose the upper portion 1*c* of the edge portion 1*e*. The second illumination source 100*b* may not cover the upper portion 1*c* of the edge portion 1*e*. The third illumination source 100*c* may cover the upper portion 1*c* of the edge portion 1*e*. The third illumination source 100*c* may irradiate light so that the irradiated light reaches the upper portion 1*c* of the edge portion 1*e* but does not reach the lower portion 1*b* of the edge portion 1*e*. The third illumination source 100*c* may at least partially expose the lower portion 1*b* of the edge portion 1*e*. The third illumination source 100*c* may not cover the lower portion 1*b* of the edge portion 1*e*. According to exemplary embodiments, as the second and third illumination sources 100*b* and 100*c* of half C-shaped, unlike the first illumination source 100*a*, are used, the second and third images E2 and E3 (see FIG. 8) may be obtained with high resolution.

A difference between optical paths to the first to third photographing portions 200*a*, 200*b*, and 200*c* may occur according to a location of the edge portion 1*e*. Therefore, a depth of focus may be adjusted by taking into account optical paths from the first to third photographing portions 200*a*, 200*b*, and 200*c* to the end portion 1*a*, the lower portion 1*b*, and the upper portion 1*c* of the edge portion 1*e*.

In order to determine focal depths of the first to third photographing portions 200*a*, 200*b*, and 200*c*, distances to the edge portion 1*e* having a round shape should be accurately measured. Therefore, the first to third photographing portions 200*a*, 200*b*, and 200*c* may include auto-focusing (AF) modules. The AF module of the first photographing portion 200*a* may perform focusing based on the end portion 1*a* of the edge portion 1*e*. The AF modules of the second and third photographing portions 200*b* and 200*c* may perform focusing respectively based on the lower surface and the upper surface of the substrate 1 adjacent to the edge portion 1*e*.

Although not shown in the drawings, the substrate edge test apparatus may include a moving unit. The first to third illumination sources 100*a*, 100*b*, and 100*c*, and the first to third photographing portions 200*a*, 200*b*, and 200*c*, the first reflection unit 151, and the plurality of second reflection units 152 may be integrally coupled to the moving unit. Accordingly, the substrate edge test apparatus may simultaneously generate the first to third images E1, E2, and E3 (see FIG. 8) while moving from an end to the other end of the edge portion 1*e*.

The substrate edge test apparatus may further include an optical microscope and a fourth illumination source corresponding to the optical microscope. The fourth illumination source may include a point illumination source, a vertical illumination source, a transverse illumination, etc., but is not limited thereto.

Figure 6:
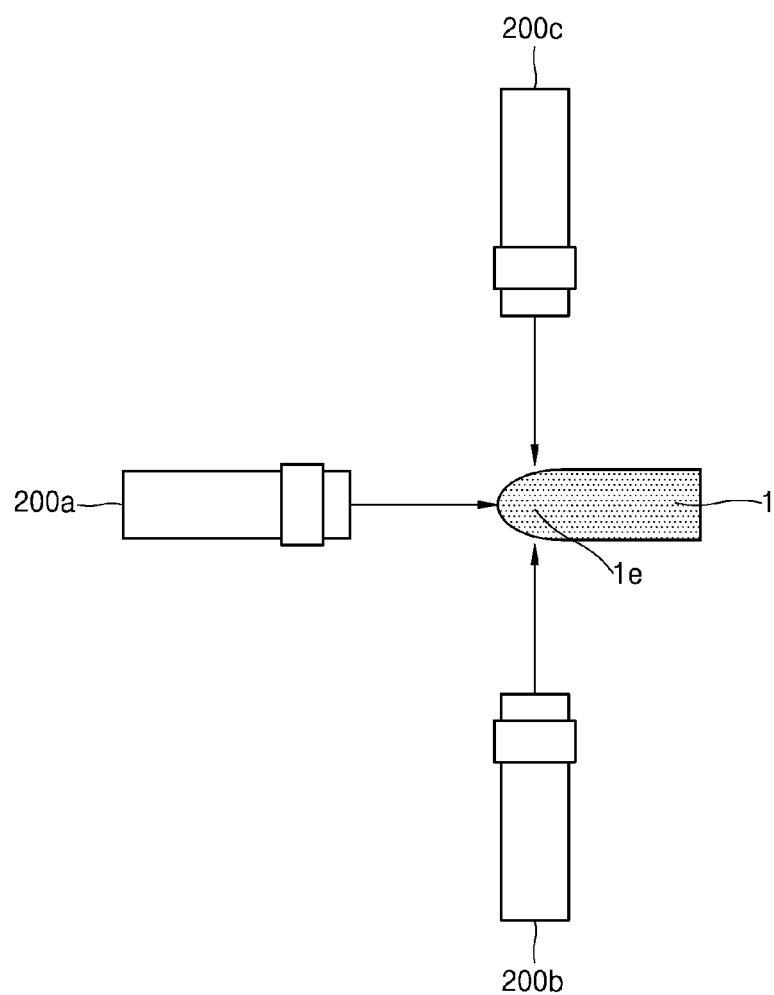
FIG. 6 is a schematic diagram illustrating an optical system that may be included in a substrate edge test apparatus according to exemplary embodiments.

FIG. 6 is a schematic diagram illustrating an optical system that may be included in a substrate edge test apparatus according to exemplary embodiments.

Referring to FIG. 6, the first to third photographing portions 200*a*, 200*b*, and 200*c* may directly receive sequentially the light reflected from the end portion 1*a*, the lower portion 1*b*, and the upper portion 1*c* of the edge portion 1*e* in the substrate. Accordingly, the first reflection unit 151 and the plurality of second reflection units 152 may be omitted.

Figure 7:
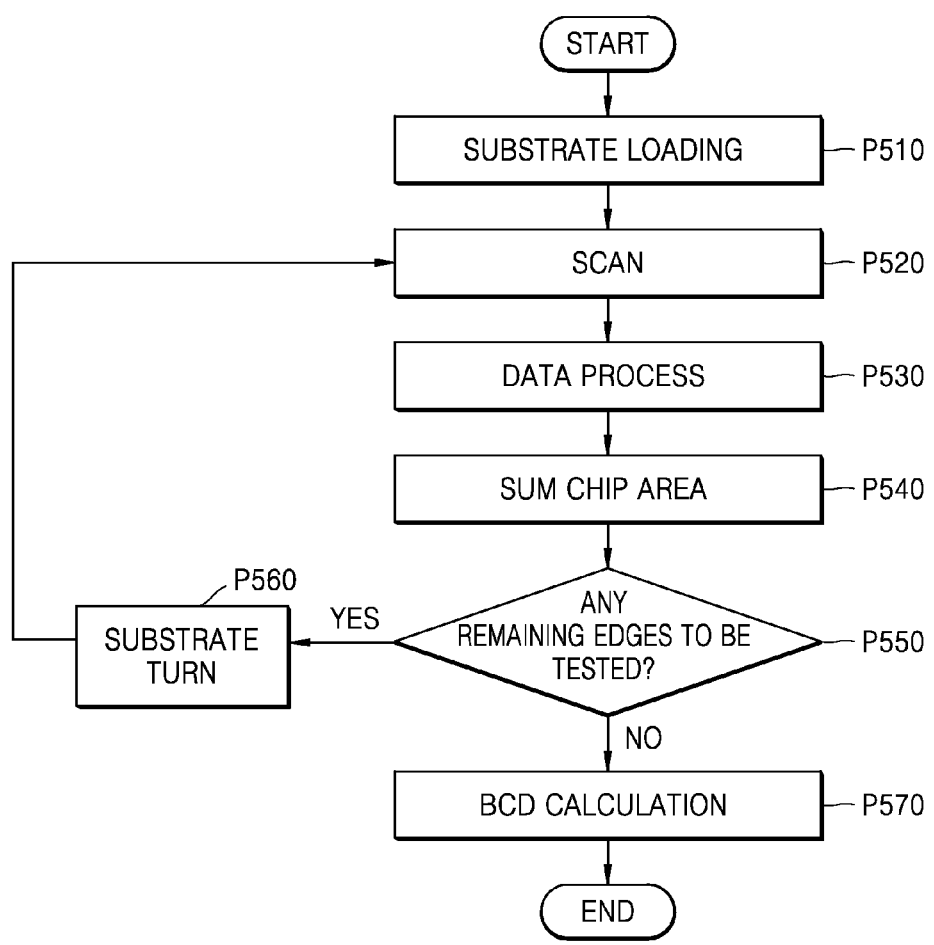
FIG. 7 is a flowchart illustrating a substrate edge test method according to an exemplary embodiments.
Figure 8:
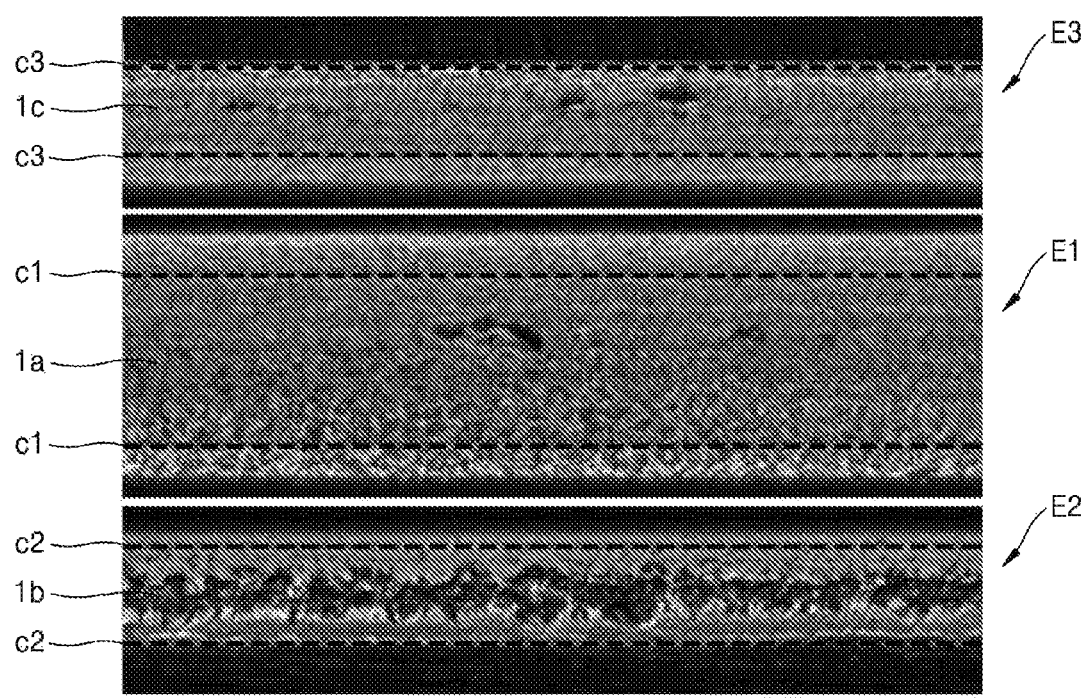
FIG. 8 is a diagram of images of a substrate edge generated according to a substrate edge test method according to an exemplary embodiments.
Figure 9:
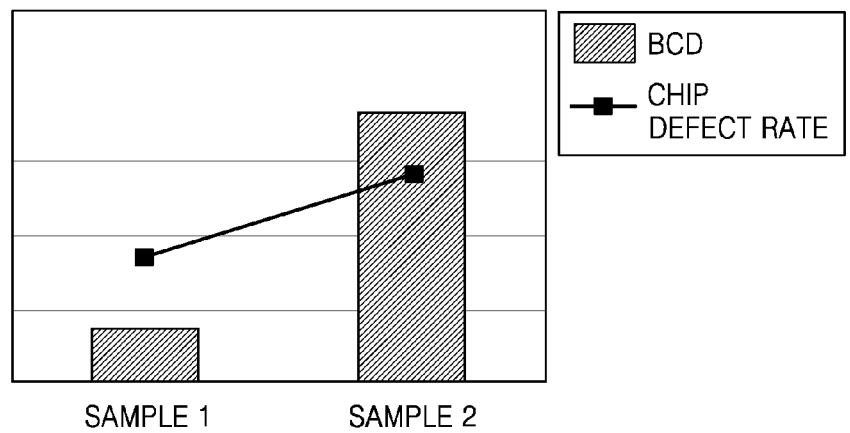
FIG. 9 is a graph for showing the effects of a substrate edge test apparatus, system, and method according to exemplary embodiments.

FIG. 7 is a flowchart illustrating a substrate edge test method according to exemplary embodiments. FIG. 8 is a diagram of images of a substrate edge generated according to a substrate edge test method according to exemplary embodiments. FIG. 9 is a graph for showing effects of a substrate edge test apparatus, system, and method according to exemplary embodiments.

Referring back to FIGS. 1, 3, 4A, 4B, and 7 to 9, the substrate 1 may be loaded on the test module 1030 including the substrate edge test apparatus according to exemplary embodiments in operation P510.

In addition, in operation P520, the substrate edge test apparatus may test the edge portion 1e of the substrate 1. As described above, the substrate edge test apparatus may successively capture images of the edge portion 1e of the substrate 1 while moving from an end to the other end of the edge portion 1e. The first to third photographing portions 200a, 200b, and 200c may be spaced apart a predetermined distance from one another along the extending direction of the edge portion 1e, and thus, the first to third photographing portions 200a, 200b, and 200c may capture images of different parts in the edge portion 1e at the same time point.

In addition, in operation P530, the test data analysis unit 1041 may generate the first image E1 including the image of the end portion 1a of the edge portion 1e. The second photographing portion 200b may generate the second image E2 including the image of the lower portion 1b of the edge portion 1e. The third photographing portion 200c may generate the third image E3 including the image of the upper portion 1c of the edge portion 1e. The first to third photographing portions 200a, 200b, and 200c may generate the first to third images E1, E2, and E3 at the same time.

If necessary, the test data analysis unit may combine the first to third images E1, E2, and E3. Since the first to third photographing portions 200a, 200b, and 200c may capture images of different parts in the edge portion 1e at the same time point, the location difference is corrected to combine the first to third images E1, E2, and E3. To correct this difference, the test data analysis unit 1041 may synchronize locations of starting points of the edge portion 1e in the first to third images E1, E2, and E3. That is, the first to third images E1, E2, and E3 may be synchronized with one another so that a starting point of the end portion 1a of the edge portion 1e on the first image E1, a starting point of the lower portion 1b of the edge portion 1e on the second image E2, and a starting point of the upper portion 1c of the edge portion 1e on the third image E3 may coincide with one another, in order to generate a whole image. The first to third images E1, E2, and E3 may be moved in parallel with one another based on differences among the physical locations of the first to third photographing portions 200a, 200b, and 200c, and accordingly, a whole image may be generated. The test data analysis unit 1041 may remove overlapping portions of the first to third images from the whole image, so that the overlapping portions in the first to third images E1, E2, and E3 may not overly reflected to the whole image.

In addition, in operation P540, the test data analysis unit 1041 may sum up areas where defects, such as chipping defects, etc., may occur. A portion where the chipping defect may occur may have illuminance or brightness different from those of a portion where the defect does not occur, due to the light dispersion or interference. The test data analysis unit 1041 may determine whether a defect, such as a chipping defect, exists based on the illuminance or brightness, and may calculate an area of the defect.

As described above, the first to third images E1, E2, and E3 may have overlapping portions. In detail, the overlapping portions of the first image E1 and the second image E2 indicate that a certain location on the edge portion 1e is shown in both the first image E1 and the second image E2.

In order to remove any error caused by the overlapping portions, the test data analysis unit 1041 may separately sum up the area of the defects, such as chipping defects, with respect to each of the end portion 1a, the lower portion 1b, and the upper portion 1c of the edge portion 1e. The test data analysis unit 1041 may sum up the areas of the defects included within first reference lines c1 that are predetermined reference lines on the first image E1. The test data analysis unit 1041 may sum up the areas of the defects included within second reference lines c2 that are predetermined reference lines on the second image E2. The test data analysis unit 1041 may sum up the areas of the defects included within third reference lines c3 that are predetermined reference lines on the third image E3.

As shown in FIG. 8, the first to third reference lines c1, c2, and c3 may be substantially in parallel with the extending direction of the edge portion 1e. The first to third reference lines c1, c2, and c3 may be reference lines for partitioning the end portion 1a, the lower portion 1b, and the upper portion 1c of the edge portion 1e based on a shape of the edge portion 1e manufactured according to desirable manufacturing processes. For example, the first reference lines c1 may include a reference line for partitioning the end portion 1a and the lower portion 1b of the edge portion 1e, and a reference line for partitioning the end portion 1a and the upper portion 1c of the edge portion 1e. The second reference lines c2 may include a reference line for partitioning the lower portion 1b of the edge portion 1e and the lower surface of the substrate, and a reference line for partitioning the lower portion 1b and the end portion 1a of the edge portion 1e. The third reference lines c3 may include a reference line for partitioning the upper portion 1c of the edge portion 1e and the upper surface of the substrate, and a reference line for partitioning the upper portion 1c and the end portion 1a of the edge portion 1e. One of the first reference lines c1 and one of the second reference lines c2 may substantially correspond to a same point on the edge portion 1e. One of the first reference lines c1 and one of the third reference lines c3 may substantially correspond to a same point on the edge portion 1e.

However, exemplary embodiments are not limited to the above examples, and the test data analysis unit 1041 may sum up the area of the chipping defect, etc., occurring on the edge portion 1e based on the whole image generated in operation P530.

In addition, in operation P550, a proceeding degree of the test may be determined. If a part of the edge portion of the substrate 1 remains to be tested, the substrate 1 may be rotated to be continuously tested in operation P560. The substrate 1 may rotate by about 90°, but is not limited thereto. Unlike the above, when all of the edge portion of the substrate is tested, a BCD (Bevel Chip Density) index that will be described later may be calculated and the test may be finished in operation P570.

During a cutting process with respect to the chamfered surface of the glass substrate, defects, e.g., non-chamfering, over-chamfering, burning, chipping, cracking, etc., may occur. In particular, the chipping defects that occur during the chamfering process may cause generation of fine particles. These fine particles may cause a defective gate in post-processes, and accordingly, the production yield and reliability of the process of manufacturing the glass substrate may degrade.

The fine particles generated from the chipping in the edge portion could adhere to a surface of the edge portion. Since the fine particles are exposed through a chemical reaction in post-processes, there is no way for checking for chipping defects in the edge portion according to the related art. As an index indicating defects such as chipping defects in the edge portion, a BCD index may be defined according to Equation 1 below.

$$BCD = \frac{\text{area of chipping defect}}{\text{area of edge portion}} \quad (1)$$

That is, the BCD index is an index for measuring the occurrence of defects by measuring a ratio of an area having chipping defects with respect to a total area.

Accordingly, the test data analysis unit 1041 may separately calculate the BCD index of each of the end portion 1a, the lower portion 1b, and the upper portion 1c of the edge portion 1e. For example, the test data analysis unit 1041 may calculate the BCD index of the end portion 1a of the edge portion 1e by dividing the sum of the area of the chipping defects on the first image E1 obtained in operation P540 by an area of the edge portion 1e disposed between the first reference lines c1 on the first image E1. The test data analysis unit 1041 may calculate the BCD index of the lower portion 1b of the edge portion 1e by dividing the sum of the area of the chipping defects on the second image E2 obtained in operation P540 by an area of the edge portion 1e disposed between the second reference lines c2 on the second image E2. the test data analysis unit 1041 may calculate the BCD index of the upper portion 1c of the edge portion 1e by dividing the sum of the area of the chipping defects on the third image E3 obtained in operation P540 by an area of the edge portion 1e disposed between the third reference lines c3 on the third image E3.

However, exemplary embodiments are not limited thereto, and the test data analysis unit 1041 may calculate a total BCD index by summing up the areas of the chipping defects on the first to third images E1, E2, and E3 obtained in operation P540, and dividing the sum area by the area of the edge portion 1e. Alternatively, the test data analysis unit 1041 may calculate the total BCD index by dividing the sum of the total area of the chipping defects occurring on the edge portion 1e, the sum being calculated based on the whole image in operation P540, by the area of the edge portion 1e.

As shown in FIG. 9, the BCD index has a positive correlation with a ratio of generating the chipping defects. That is, the ratio of generating chipping defect increases as the BCD index increases. By measuring the BCD index from the image obtained by the substrate edge test apparatus according to exemplary embodiments, rapid feedback may be obtained, and accordingly, a production yield and quality of the manufacturing process may be improved.

While the present disclosure has been particularly shown and described with reference to exemplary embodiments described herein, it will be understood that various changes in form and details may be made therein without departing from the spirit and scope of the following claims.

The invention claimed is:

1. A method of testing an edge portion of a substrate, the method comprising:
generating a first image by irradiating light with uniform illuminance to an end portion of the edge portion of a substrate and photographing the end portion by using a first photographing portion, wherein the edge portion of the substrate is chamfered;
generating a second image by irradiating light with uniform illuminance to a lower portion of the edge portion and photographing the lower portion by using a second photographing portion;
generating a third image by irradiating light with uniform illuminance to an upper portion of the edge portion and photographing the upper portion by using a third photographing portion; and
evaluating quality of the edge portion of the substrate based on the first image to the third images,
wherein the evaluating of the quality of the edge portion in the substrate based on the first to third images comprises:
summing up a first area comprising at least one area of defects within a set of first reference lines, wherein the first reference lines are predetermined reference lines on the first image;
summing up a second area comprising at least one area of defects within a set of second reference lines, wherein the second reference lines are predetermined reference lines on the second image;
summing up a third area comprising at least one area of chipping defects within a set of third reference lines, wherein the third reference lines are predetermined reference lines on the third image; and
dividing a sum of the first to third areas by an area of the edge portion.

2. The method of claim 1, wherein the obtaining of the first image to the obtaining of the third image are performed substantially at same time, and the first to third images captured at substantially the same time correspond to different points on the edge portion.

3. The method of claim 1, further comprising:
generating a whole image by collecting the first to third images.

4. The method of claim 3, wherein the obtaining of the whole image comprises obtaining the whole image by synchronizing locations of start points of the edge portion on the first to third images or by correcting locations of the first to third images based on a difference between locations of the first to third photographing portions.

* * * * *